United States Patent [19]
Steinich et al.

[11] Patent Number: 6,084,400
[45] Date of Patent: Jul. 4, 2000

[54] ANGLE OF ROTATION SENSOR HAVING A COUNTING ARRANGEMENT WITH AT LEAST TWO PULSER-WIRE MOTION SENSORS PROVIDING ELECTRICAL ENERGY USED AS A VOLTAGE SUPPLY

[75] Inventors: Klaus-Manfred Steinich, Pöring; Peter Wirth, München, both of Germany

[73] Assignee: AMB GmbH, Unterhaching, Germany

[21] Appl. No.: 08/716,225

[22] PCT Filed: Mar. 6, 1995

[86] PCT No.: PCT/DE95/00308

§ 371 Date: Apr. 30, 1997

§ 102(e) Date: Apr. 30, 1997

[87] PCT Pub. No.: WO95/24613

PCT Pub. Date: Sep. 14, 1995

[30] Foreign Application Priority Data

Mar. 7, 1994 [DE] Germany .............................. 44 07 747

[51] Int. Cl.[7] .............................. G01B 7/30; G01P 13/04; G01D 5/245

[52] U.S. Cl. ................................. 324/207.13; 324/207.25

[58] Field of Search .......................... 324/207.14, 207.13, 324/207.23, 207.24, 207.25, 235, 173, 174; 307/65, 66

[56] References Cited

U.S. PATENT DOCUMENTS 4,127,812 11/1978 Baliguet .................................. 324/174
4,779,075 10/1988 Zagelein et al. .................... 324/207.24

FOREIGN PATENT DOCUMENTS 28 17 169 10/1979 Germany .
29 18 498 12/1979 Germany .
30 06 585 9/1981 Germany .
82 06 731 7/1982 Germany .
32 19 491 12/1982 Germany .
32 25 500 1/1984 Germany .
37 29 949 3/1989 Germany .
39 30 345 3/1991 Germany .
42 24 129 1/1994 Germany .

OTHER PUBLICATIONS

*Technical Measuring*, 51$^{st}$ Edition 1984 4$^{th}$, pp. 123–129 entitled "Wiegand–Sensoren für Weg–und Geschwindigkeitsmessungen (Wiegand Sensors for Distance and Speed measurements)" by H.J. Gevatter et al.

*Messen & Prüfen/Automatik*, May 1984, pp. 236–239 entitled "Eigenschaften des Wiegand–Sensors (Properties of the Wiegand Sensors)" by Dipl.–Ing. M. Wrobel.

*Electronics*, Dec. 15, 1983, pp. 90 and 92 entitled "Magnetic sensor is torsion–formed".

*Primary Examiner*—Walter E. Snow
*Attorney, Agent, or Firm*—Evenson, McKeown, Edwards & Lenahan, PLLC

[57] ABSTRACT

An angle of rotation sensor for measuring the angular position of a rotary shaft during more than one revolution consists of a fine angle of rotation sensor linked to the rotary shaft and of a counter. The revolutions of the shaft are all counted without mechanical gears, without an outer voltage supply and without supply batteries, with a simple and economical design. Pulse wire movement sensors supply voltage pulses depending on the rotation of the shaft. The number of voltage pulses is stored in a non-volatile read/write memory.

10 Claims, 7 Drawing Sheets

ANGLE OF ROTATION SENSOR HAVING A COUNTING ARRANGEMENT WITH AT LEAST TWO PULSER-WIRE MOTION SENSORS PROVIDING ELECTRICAL ENERGY USED AS A VOLTAGE SUPPLY

BACKGROUND OF THE INVENTION

The subject of the invention is an angle of rotation sensor for measurement of an angular position of a rotary shaft over more than one revolution.

From DE 41 37 092 A1 there is a known angle of rotation sensor in which an angle encoder, which can be a scanned coded disc, registers the angular position of a rotary shaft for a single revolution. A potentiometer subsequent to the coded disc registers the absolute angular position of the rotary shaft over several revolutions. A subsequent evaluation circuit combines the position of the coded disc together with the number of revolutions, under consideration of the gear-train play and measurement tolerance of the potentiometer. Angle of rotation sensors of this type always supply the absolute angle of rotation over several revolutions independently of any intermediate interruptions of the power supply. Disadvantages are the high production costs for the gear-train and sensor elements, as well as the limited durability because of the many mechanical moving parts. The number of revolutions which can be registered is limited by nature of the mechanical construction.

From DE 37 29 949 A1 there is an angle of rotation sensor known with a counting arrangement Z, several pulse-wire motion sensors S1 to S6 arranged around the circumference, and several magnets M. The outputs of the pulse-wire motion sensors are so applied to the counting arrangement that the count in the counting arrangement represents the angular position of an input wheel attached to the rotary shaft. The disadvantage of this arrangement is that the counting arrangement ceases to function with loss of power supply, such that rotation of the shaft can no longer be registered and the actual count is lost.

A known angular position sensor of this type is the product CE 100 from the company T+R, Trossingen. A fine sensor element registers the angular position of the shaft over one revolution, the measured values repeating periodically with each revolution. One or more coarse sensors are coupled subsequent to the fine sensor by means of gearing. The absolute measurement value is the result of a suitable combination of the measurements from the fine and the coarse sensor elements. Angular position sensors of this type supply the absolute angle of rotation over a large number of revolutions, independently of any intermediate interruption of the power supply. Disadvantages are the high production costs for the gear-train and the sensor elements, as well as the limited durability because of the many mechanical moving parts. The number of revolutions which can be registered is limited by the nature of the mechanical construction.

A further angle of rotation sensor of the stated type is known from the product OAM-74-11/24 bit-LPS-5V (TS5778N10) from the Tamagawa Seiko Company, Tokio. A measurement arrangement registers the angular movement of a rotary shaft. By means of a counter, incremental shaft movements are summed over several rotations under consideration of the direction of rotation to provide an absolute value. On loss of supply voltage, the operation of the angle of rotation sensor is maintained by means of a buffer battery. Long interruptions in the voltage supply during stoppages also have to be bridged by the buffer battery. The cost of realising this form of sensor is less than that for gear-coupled angle sensor elements. The disadvantage of this arrangement is the limited life of the buffer batteries. These need to be replaced at regular intervals. A further disadvantage is the necessity to supply the sensor element from a buffer battery and the associated additional battery load. Under extreme environmental conditions such as high or low temperature batteries cannot be used.

SUMMARY OF THE INVENTION

As opposed to these arrangements, the invention has the goal of further developing the type of angle of rotation sensor presented initially such that with simple construction and low cost, when the external supply of voltage fails, the shaft rotations continue to be counted without resource to mechanical gears or the supply of power from batteries.

To solve this task, the invention makes use of the characteristics wherein the counting arrangement comprises at least two pulse-wire motion sensors fixed on an arc segment, at least one permanent magnetic, a non-volatile read/write memory, and an electronic countercircuit. Accordingly, pulse-wire motion sensors give out voltage pulses, the quantity of which is placed into a non-volatile read/write memory. A pulse forming circuit produces a voltage from the pulses given out by the pulse-wire motion sensors which is used to supply a control circuit, the non-volatile read/write memory and an up/down counter, such that advantageously without an external supply of power or without the use of voltage stored in batteries, the number of shaft revolutions can be counted. This and further advantageous developments of an invention-worthy angle of rotation sensor are noted in the subtitles.

BRIEF DESCRIPTION OF THE DRAWINGS

The invention will be explained as follows on the basis of embodiments, with reference to the drawings.

These show

DETAILED DESCRIPTION OF THE DRAWINGS

Figure 1:
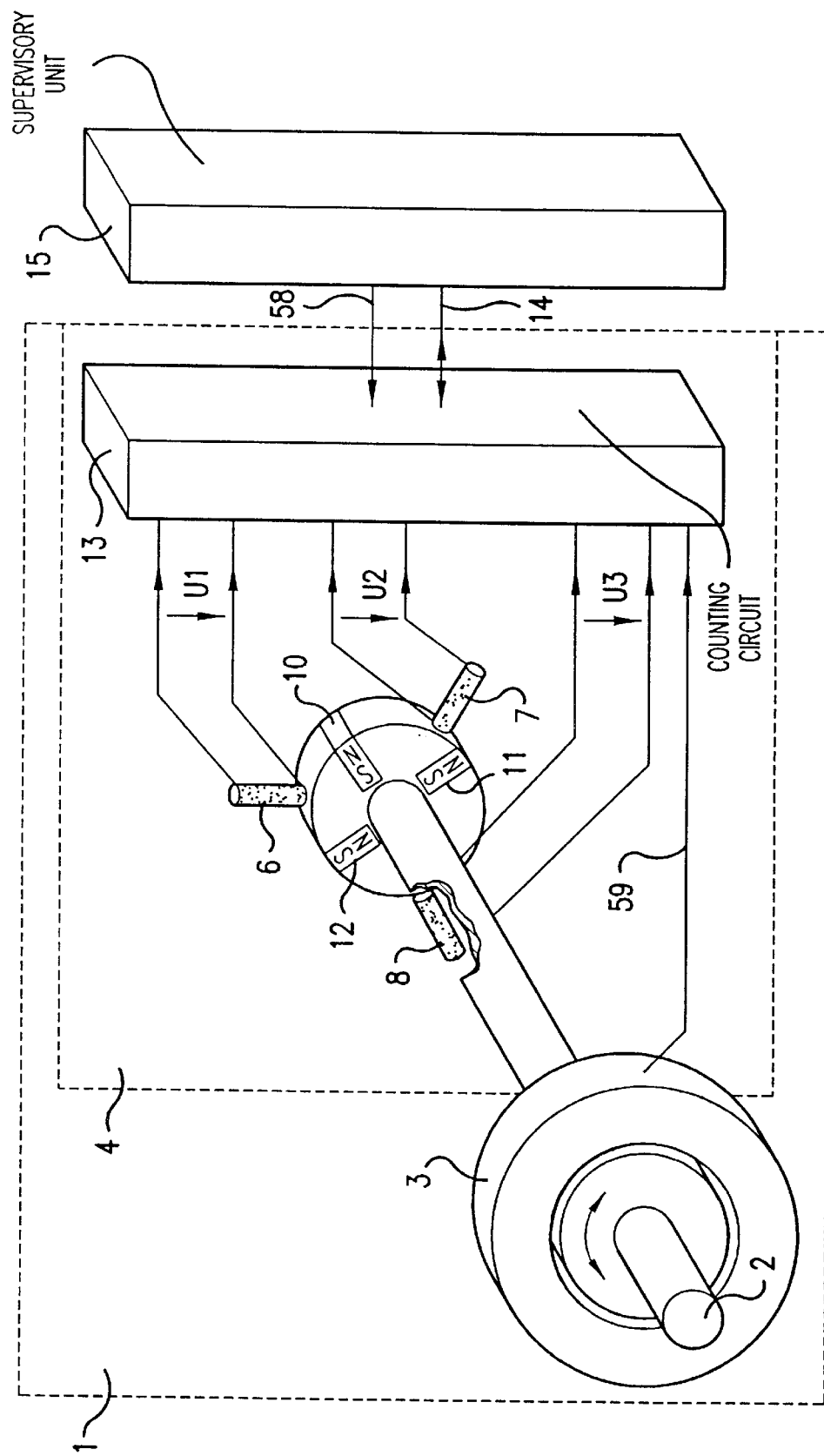
FIG. 1 a block diagram of the advantageous angle of rotation sensor.

The angle of rotation sensor 1 displayed in FIG. 1 consists of a rotary shaft 2, a fine angle of rotation sensor connected to the shaft which measures angle of rotation over one revolution, and a counting arrangement 4 to count the total number of revolutions of the rotary shaft. The counting arrangement of this embodiment has pulse-wire motion sensors 6,7,8, permanent magnets 10,11,12 attached to the shaft, and an electronic counting circuit 13. The counter is supplied with voltage pulses 28,29,30 from the motion sensors, and via conductor 59 with the measurement value from the fine angular position sensor. The fine angle of rotation sensor is provided by a known element, e.g. as an optical encoder or resolver. The counter circuit is connected to a supervisory unit 15 via an interface with connections 14 and a voltage supply via connection 15.

Figure 3:
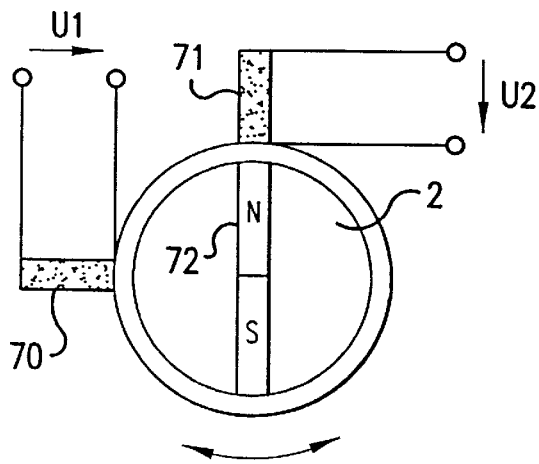
Figure 4:
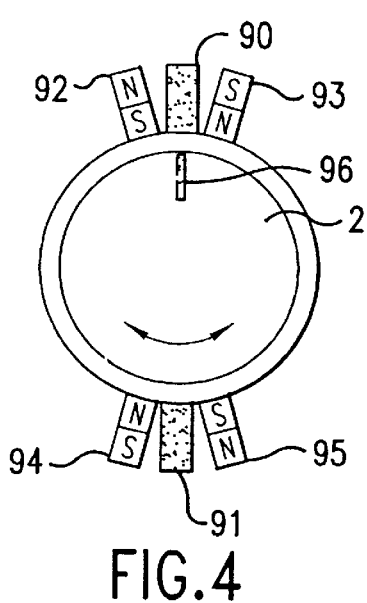

FIG. 1, FIG. 3 and FIG. 4 show various principle forms of arrangement of pulse-wire motion sensors, permanent magnets and pole-pieces. The voltage pulses from the motion sensors are assigned to particular angular positions of the rotary shaft 2. Under consideration of past rotation states by making use of voltage pulses which have occurred in the past it is possible to:

register every full rotation of the rotary shaft 2, take into consideration the direction of rotation of the rotary shaft, take into consideration the characteristic position differences between the set and reset action of Wiegand sensors, unequivocally associate the voltage pulses from the motion sensors with the number of revolutions of the rotary shaft through a combination of the rotation state as given by the voltage pulses and the position given by the fine angle sensor, also for mechanically or magnetically produced tolerances in the angular position of the voltage pulses.

Figure 2:
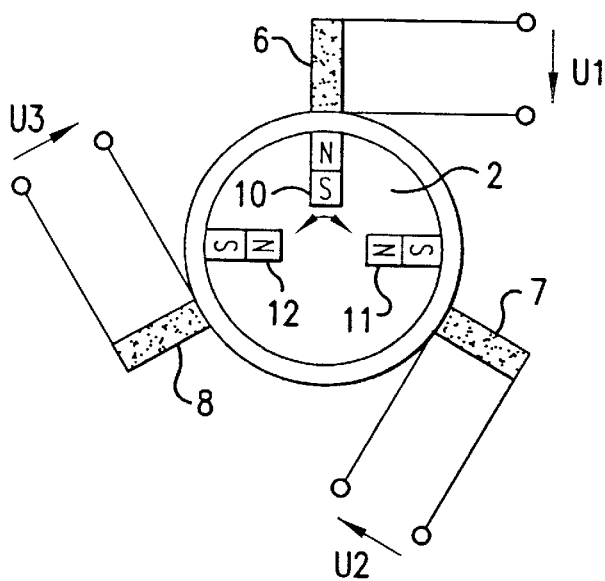
FIG. 2 a schematic mechanical configuration of three motion sensors and three permanent magnets, FIG. 3 a schematic mechanical configuration of two motion sensors and a single permanent magnet, FIG. 4 a schematic mechanical configuration of two motion sensors, four permanent magnets and one pulse wire, FIG. 5 an arrangement of motion sensors with permanent magnets positioned radially to the axis of the rotary shaft, FIG. 6 an arrangement of a pole-piece positioned radially to the axis of the rotary shaft, FIG. 7 an arrangement of motion sensors with permanent magnets parallel to the axis of the rotary shaft, FIG. 8 an arrangement of two pole-pieces parallel to the axis of the rotary shaft, FIG. 9 an electronic counting circuit with pulse shaping circuit, FIG. 10 an pulse diagram showing the voltage pulses produced by the three motion sensors, FIG. 11 a state-diagram to explain the evaluation of the voltage pulses produced by the three motion sensors.

FIG. 2 shows an arrangement with three unipolar pulse-wire motion sensors 6,7,8, fixed on arc-segments with a spacing of 120 degrees, a switching permanent magnet 10 attached to the rotary shaft 2, and two reset magnets 11, 12, attached to the rotary shaft. The pulse-wire motion sensors, also known as Wiegand sensors, are realised in this arrangement in a know manner with pulse-wire segments wound with sensing coils. Set and reset magnets are so arranged that they pass the motion sensors on rotation of the shaft such that the magnetic fields of the set and reset magnets permeate the impulse-wire of the sensors with a corresponding change of polarity. When the switching magnet 10 passes any of the motion sensors, then these produce from the sensing coils in a known manner through the simultaneous change of magnetisation of all magnetic domains (Weiβ regions) in the pulse-wire, short voltage pulses of a defined amplitude and duration. The passing of a reset permanent magnet 11, 12 sets the magnetic state of the motion sensor back again.

Unipolar functioning pulse-wire motion sensors, as known, supply a voltage pulse only on the switching action, not on the reset action. Pulse length and amplitude are not dependent on the speed of motion of the switching and reset magnets. Switching and reset magnets are so arranged on the rotor such that after the switching magnet has passed, a reset magnet will always pass a motion sensor before the switching magnet passes either of the other two motion sensors. The advantage of the arrangement according to FIG. 2 is the high voltage amplitude produced by unipolar operating pulse-wire motion sensors.

FIG. 3 shows a design form with two fixed bipolar pulse-wire motion sensors 70, 71 positioned on an arc with 90 degree separation and a permanent magnet 72 attached to the rotary shaft 2. As opposed to unipolar sensors, bipolar pulse-wire motion sensors provide a voltage pulse on both the switching and the reset action. The advantage of this arrangement is the realisation with a minimum quantity of motion sensors.

FIG. 4 shows a design form with two fixed bipolar pulse-wire motion sensors positioned on an arc with 180 degree separation, consisting of two sensing coils 90, 91, two permanent magnets 92, 93 acting on sensing coil 90, two permanent magnets 94, 95 acting on sensing coil 91 and a pulse-wire motion sensor 96 attached to the rotary shaft 2. As opposed to the previous examples according to FIG. 2 and FIG. 3 the sensing coil of the pulse-wire motion sensor is, in a known manner, separated from the pulse-wire and positioned between two permanent magnets.

When rotation of the shaft causes the pulse-wire to pass both the magnets and the sensing coil, two magnetisations of the pulse-wire occur, only one of which, due to the geometrical arrangement so influences the magnetic field in the sensing coil such that a voltage pulse is induced. This arrangement supplies voltage pulses whose polarity indicates the sense of rotation.

Figure 5:
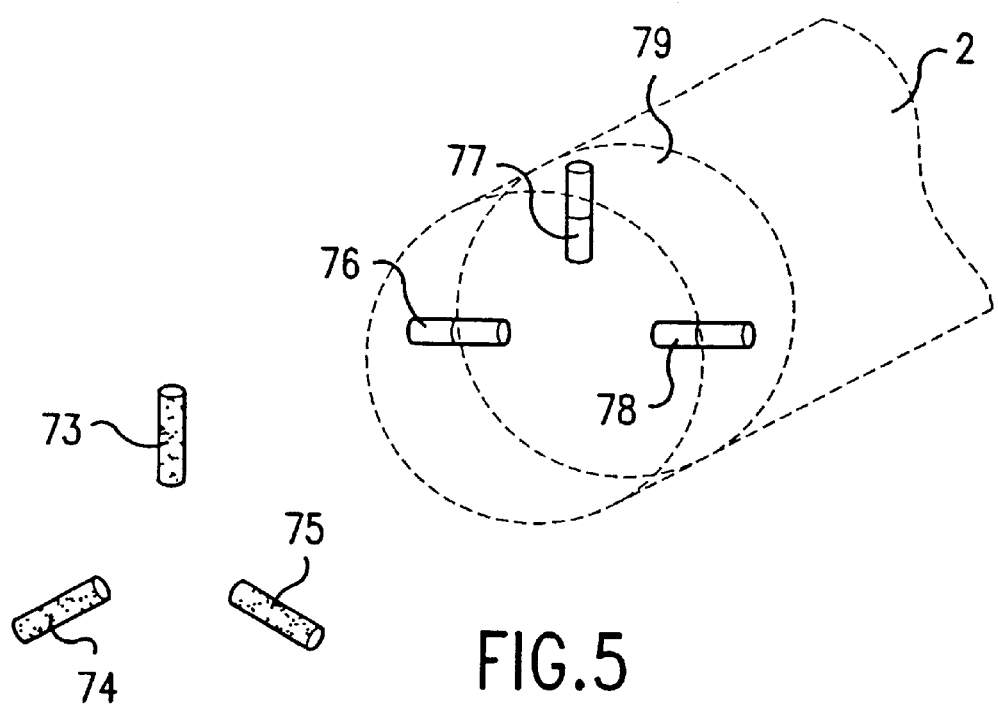

FIG. 5 shows a mechanical arrangement of three motion sensors 73, 74, 75, a permanent switching magnet 77 and two reset permanent magnets 76, 78. The effective magnetic axes of the motion sensors and the permanent magnets are positioned radially to the axis of the rotary shaft 2. The permanent magnets which are attached to the shaft are embedded in a part of the shaft constructed of material non-conductive to magnetic fields in order that the forming of magnetic fields is not influenced by the material of the shaft. An arrangement in this form allows the construction of an angle of rotation sensor conforming to the invention with a small outside diameter.

Figure 6:
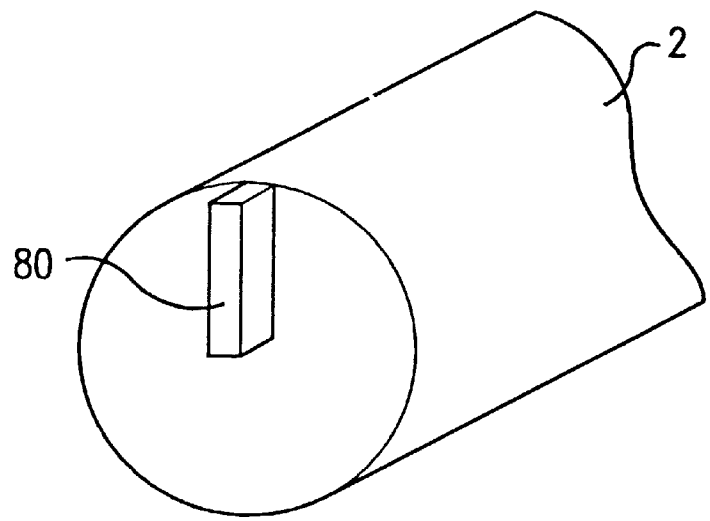

FIG. 6 shows a mechanical arrangement of three motion sensors 73, 74, 75 consisting of units each made in a known manner from a bipolar functioning pulse-wire motion sensor and two permanent magnets, are arranged as shown in FIG. 5. The magnetisation of the motion sensors is carried out by a moving pole-piece 80, attached to the rotary shaft. The magnetic flux from both permanent magnets permeates the motion sensor (pulse-wire and the sensing coil wound around it) in opposite directions via air-gaps. When an air-gap is bridged by the proximity of the moving pole-piece 80, the magnetic flux from one magnet is magnified and the motion sensor is re-magnetised in an opposite sense. Similarly, the motion sensor is remagnetised in the opposite sense when the pole-piece is in the proximity of the other air-gap. The advantage of this arrangement rests on the particularly simple realisation of the parts of the arrangement which are in motion.

Figure 7:
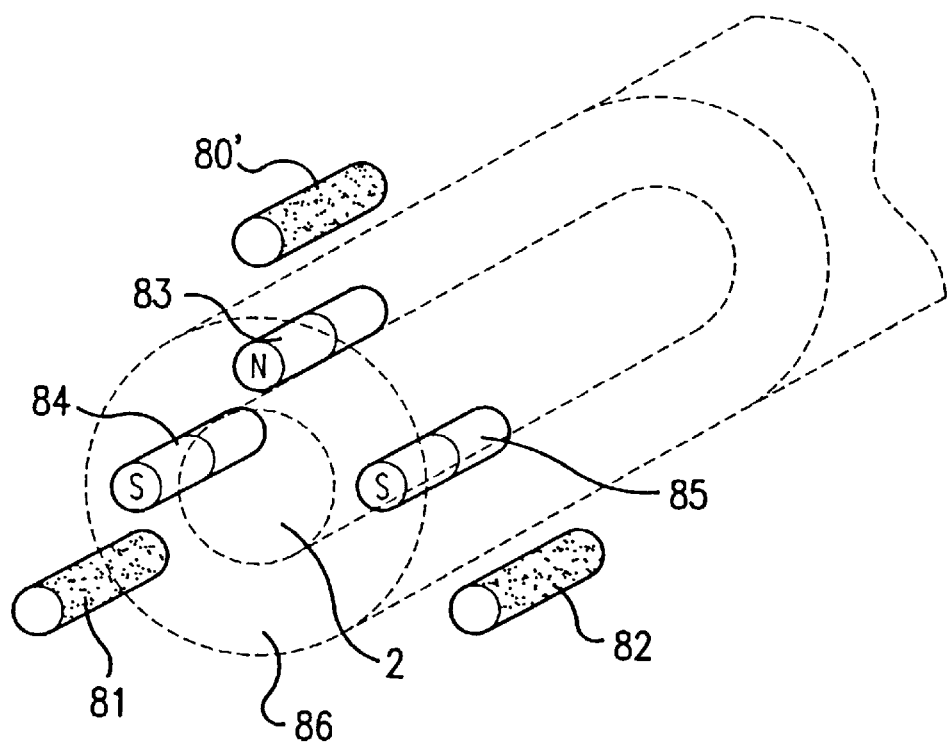

FIG. 7 shows a further mechanical arrangement of three motion sensors 80', 81, 82, a switching permanent magnet 83 and two reset permanent magnets 84, 85. The effective magnetic axes of the motion sensors and the permanent magnets are positioned parallel to the axis of the rotary shaft 2. The permanent magnets which are attached to the shaft are embedded in a part of the shaft constructed of material non-conductive to magnetic fields in order that the forming of magnetic fields is not influenced by the material of the shaft. An arrangement in this form allows the construction of an angle of rotation sensor conforming to the invention with a particularly short length.

Figure 8:
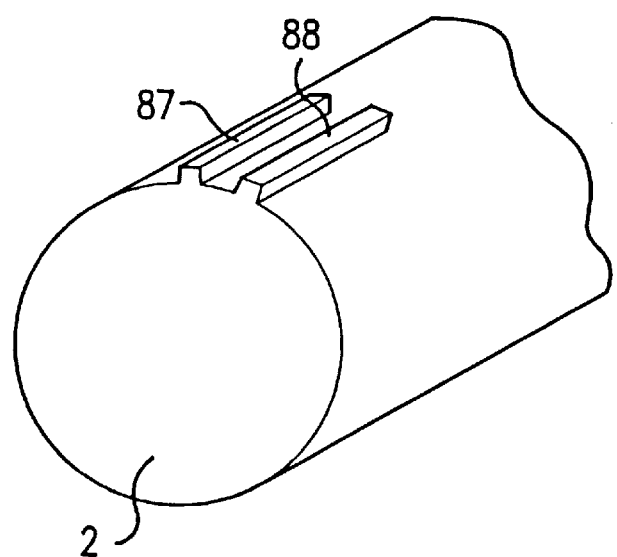

FIG. 8 shows a mechanical arrangement of three motion sensors 80', 81, 82, consisting of units made in a known manner from a unipolar functioning pulse-wire motion sensor (see FIG. 6) and two permanent magnets, are arranged as shown in FIG. 7. The magnetisation of the motion sensors is carried out by two moving pole-pieces 87, 88 which are attached to the rotary shaft, as described in FIG. 6. The advantage of this arrangement, apart from the particularly simple realisation of the parts which are in motion, lies in the short length of the construction.

Figure 9:
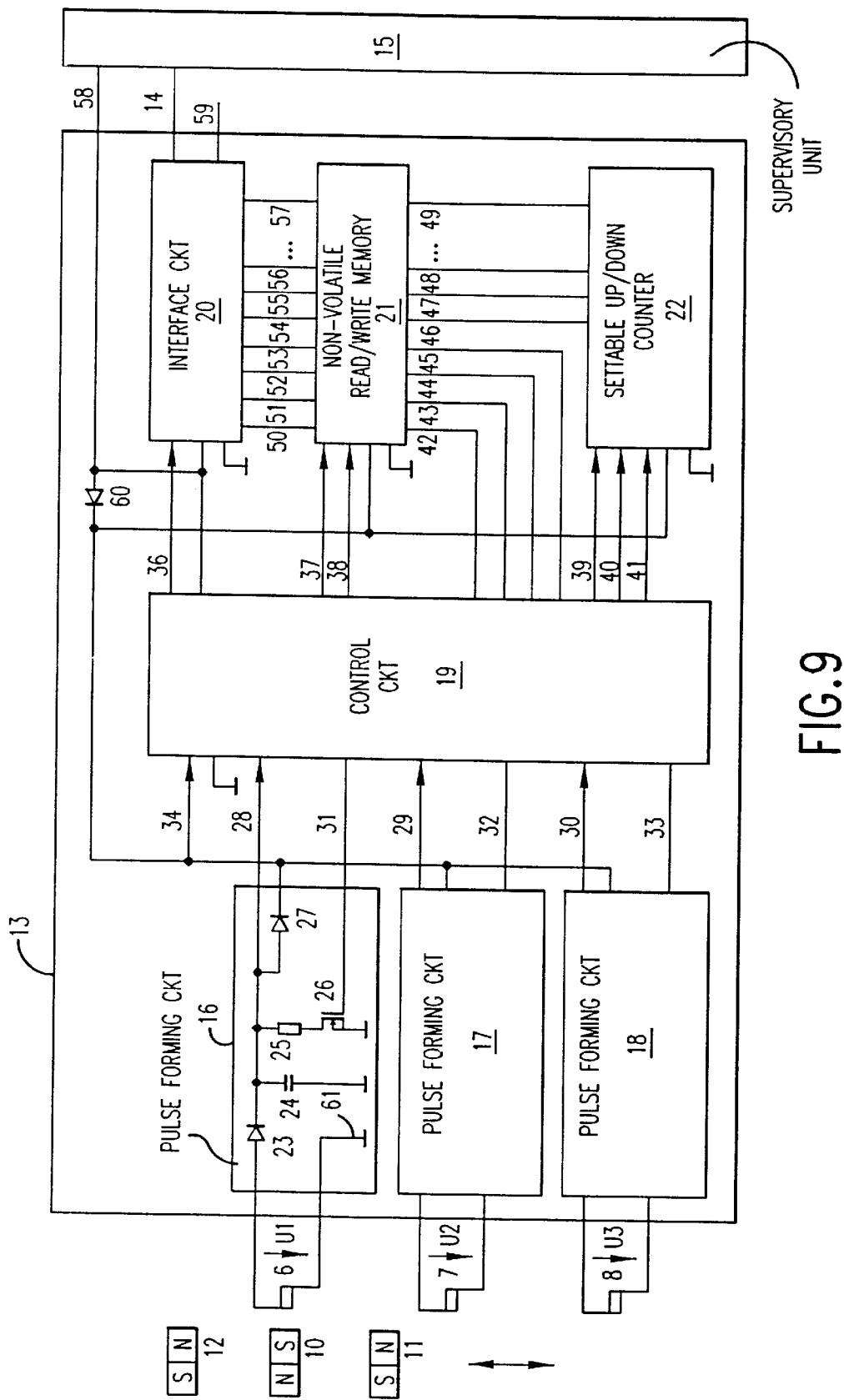

FIG. 9 shows the arrangement of an electronic circuit 13 consisting of three pulse forming circuits 16, 17, 18, a control circuit 19, a settable up/down counter 22, a non-volatile read/write memory 21 and a computing/interface circuit 20. Each of the pulse forming circuits consists of a diode 23, a charging capacitor 24, a discharge resistor 25, an electronic switch 26 and a diode 27. The voltage pulses U1, U2, U3 produced by the motion sensors 6, 7, 8, are applied to the three pulse forming circuits 16, 17, 18. A voltage pulse passes diode 23 in the conductive direction and charges capacitor 24.

The voltage on the charging capacitor, as an impulse voltage vector Y=[Y1, Y2, Y3] consisting of the analogue signals Y1, Y2, Y3, 28, 29, 30, is passed to the control circuit 19. The capacitor voltage is applied to the circuit consisting of an electronic switch 26 and discharge capacitor 25. Logic signals "discharge charging capacitor" 32, 32, 33 to discharge the charging capacitors are supplied to the electronic switches from the control circuit 19. An auxiliary voltage supply is obtained from the charging capacitor via diode 27 in the conducting direction and applied to conductor 34. The auxiliary voltage supply is supplied to the power supply inputs of the control circuit 19, the up/down counter 22 and the non-volatile memory 21. The auxiliary voltage supply and the external voltage supply via conductor 34 are connected together by means of diode 60 in a conducting direction.

Thus under normal operating conditions with an external source of voltage the control circuit, the up/down counter and the non-volatile memory are supplied with operating power externally. Should the external source of power fail, then the fine angle of rotation sensor, the computing and the interface circuits are no longer supplied with a source of operating voltage and the counting of shaft revolutions is carried out utilising the auxiliary voltage supply obtained from the pulse forming circuit. The control circuit 19 provides a logic-signal "output ready" 36 to control the transfer of the value of the number of revolutions to the computing and interface circuit 20 and the logic signals "write to non-volatile memory" 37 and "read from non-volatile memory" 38 to control the operation of the non-volatile memory. Further, the control circuit is connected to the non-volatile memory via the logic signal "counter direction" 42 and the condition vector "last revolution state" Z=[Z1, Z2, Z3] consisting of the logic signals Z1, Z2, Z3, 43, 44, 45. Further, the control circuit provides the logic signals "clock" 39, "up/down" 40 and "set counter" 41 to the up/down counter.

The up/down counter is connected to the non-volatile memory by the data word "revolutions", consisting of the data bits D0, D1, ... Dn 46, 47, 48, ... 49 by means of which the revolution count can be loaded and returned. The non-volatile memory is connected to the computing and interface circuit 20 via logic signal "count direction output" 50 and a condition vector "last revolution condition output" Z'=[Z1', Z2',Z3'] consisting of the logic signals Z1',Z2',Z3', 51, 52, 53, and via data word "revolutions output", consisting of the data bits D0', D1', ... Dn' 54, 55, 56, ... 57. The non-volatile memory is realised using ferro-electric storage technology. It contains a data word, split for example into twelve bits for the revolution count, three bits as storage for the condition vector "last revolution condition" Z and one bit for "count direction" 42. Storage elements in ferro-electric technology are characterised by particularly low power consumption and by fast read and write modes. The storage element in ferro-electric storage technology is an electrical crystal dipole. Similarly to a ferro-magnetic dipole, this changes its direction under the influence of an electrical field, and maintains this direction in the absence of a supply of power. In another form of realisation according to subtitle 7, the non-volatile read/write memory uses a static semiconductor element in CMOS technology with a buffer battery or a buffer capacitor. Since the motion sensors do not require a source of power, this form of realisation requires an advantageously low supply current for the operation of the non-volatile memory, such that the buffer battery remains useable over a long lifetime.

Figure 10:
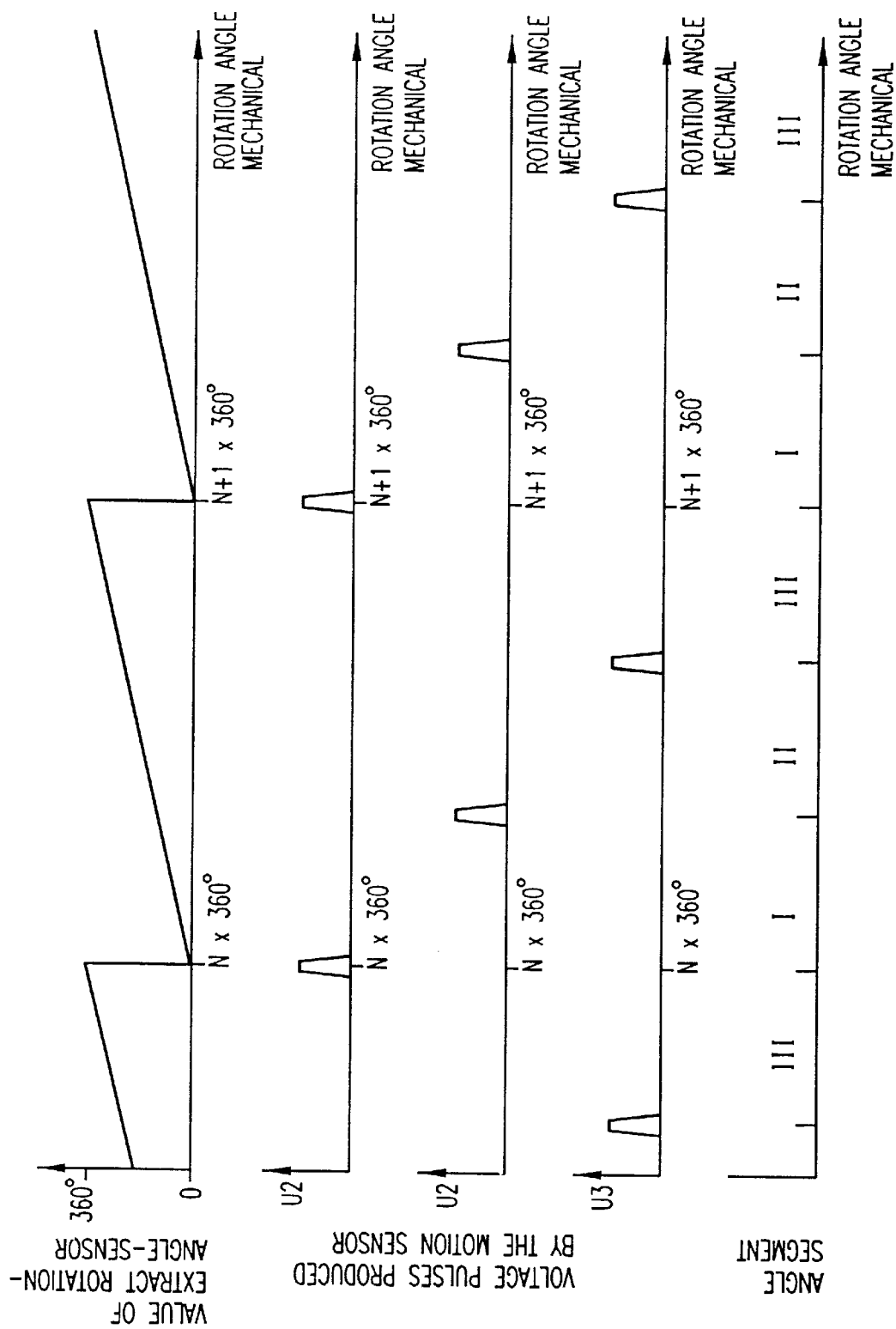

FIG. 10 shows as an example the voltage pulses produced by the three pulse-wire sensors 6, 7, 8, and their correspondence to the absolute rotation angle of the rotary shaft 2:

$$WA = WF + N \times 360°$$

where

N: number of revolutions of the shaft

WA: absolute angle of rotation

WF: angle of rotation over one revolution

By means of the voltage pulses U1, U2, U3 a single revolution of the shaft is divided into three sectors I, II, III. The occurrence of voltage pulse U1 indicates for an anti-clockwise rotation the transition from sector III to sector I and for clockwise rotation the transition from sector I to sector III. A similar condition applies to the voltage pulses U2, U3. The angular position of the rotary shaft can thus be determined to be within either sectors I, II or III by evaluating the state of the voltage pulses U1, U2, U3 taking into consideration the previous states U1 (−1), U2(−1), U3(−1). The number of shaft revolutions can be determined by the evaluation of the voltage pulses as follows.

The following is a description of one arrangement showing the operation of the motion sensors 6, 7, 8, the electronic counter 13, the pulse forming circuits 16, 17, 18, the control circuit 19, the settable up/down counter 22, the non-volatile memory 21 and the computing and interface circuit 20 by means of logical relationships and control sequences.

The "pulse voltage vector" Y=[Y1, Y2, Y3] assumes the values Y=[100], Y=[010], Y=[001], with the following meaning:

Y=[100]: actual switching magnet position in arc segment I or III

Y=[010]: actual switching magnet position in arc segment I or II

Y=[001]: actual switching magnet position in arc segment II or III

The condition vector "last rotation condition" Z=[Z1, Z2, Z3] assumes the values Z=[100], Z=[010], Z=[001], with the following meaning:

Z=[100]: last switching magnet position in arc segment I or III

Z=[010]: last switching magnet position in arc segment I or II

Z=[001]: last switching magnet position in arc segment II or III

The logic signal "count direction" has the following meaning

RB=0: clockwise rotation, count down

RB=1: anticlockwise rotation, count up

The condition vector "last rotation condition" Z and the logic signal "count direction" are stored in the non-volatile memory.

After the build-up of the auxiliary supply voltage UV' as the result of a voltage pulse from one of the motion sensors, the control circuit works through the following control sequence:

Step 1: wait for voltage pulse, then continue with step 2

Step 2: load the up/down counter from the non-volatile memory, read pulse voltage vector Y=[Y1, Y2, Y3 ], load "last revolution condition" Z=[Z1, Z2, Z3 ] from non-volatile memory Step 3: increment, decrement or leave the up/down counter unchanged based on the evaluation of "count direction", voltage pulse vector Y and condition vector "last revolution condition", using the logic signals "clock", "up/down" and "set counter"

Step 4: determine new direction of rotation, set the count direction bit accordingly Step 5: write the contents of the up/down counter 22, the voltage pulse vector Y as condition vector "last revolution condition" Z, and direction bit RB into the non-volatile memory 21.

Step 6: if the external supply of power is present, transfer the contents of the non-volatile memory 21 to the computing and interface circuit 20 using the logic signal "output ready".

Step 7: discharge the charging capacitor by operating the electronic switch. Continue with step 1.

This control sequence ensures that the up/down counter is loaded with the contents of the non-volatile memory, is either incremented or decremented depending on the pulse voltage vector Y, the condition vector "last revolution condition" Z and the count direction bit RB and the result returned to the non-volatile memory.

The count direction bit RB is set according to the logical evaluation of the equations (G1) to (G9):

| | |
|---|---|
| If Z = [100] AND Y = [001] then RB = 0 (down) | (G1) |
| If Z = [100] AND Y = [010] then RB = 1 (up) | (G2) |
| If Z = [100] AND Y = [100] then RB is not changed | (G3) |
| If Z = [010] AND Y = [100] then RB = 0 (down) | (G4) |
| If Z = [010] AND Y = [001] then RB = 1 (up) | (G5) |
| If Z = [010] AND Y = [010] then RB is not changed | (G6) |
| If Z = [001] AND Y = [010] then RB = 0 (down) | (G7) |
| If Z = [001] AND Y = [100] then RB = 1 (up) | (G8) |
| If Z = [001] AND Y = [001] then RB is not changed | (G9) |

Changing the up/down counter is dependent on the pulse voltage vector Y, condition vector "last rotation condition" Z and count direction bit RB according to the following logical conditions:

| | |
|---|---|
| If Z = [001] AND Y = [100] AND RB = 1 then N = N + 1 | (G10) |
| If Z = [010] AND Y = [100] AND RB = 0 then N = N − 1 | (G11) |
| If Z = [100] AND Y = [010] AND RB = 0 then N = N + 1 | (G12) |
| If Z = [100] AND Y = [001] AND RB = 1 then N = N − 1 | (G13) |
| For all other conditions N = N | (G14) |

The equations (G10) and (G11) indicate that for each pulse U1 from the motion sensor 6 for monotonic rotation of the rotary shaft in clockwise or anticlockwise direction respectively, the up/down counter will be respectively incremented or decremented by the value "1". The equations (G12) and (G13) indicate that after a change in the direction of rotation the pulses U2, U3 from the motion sensors 7 and 8 will accordingly be used to increment or decrement the rotation counter.

The computing and interface circuit 20 combines together the measurement value from the fine angle of rotation sensor and the value from the rotation counter stored in non-volatile memory to provide an absolute value for the angle of rotation. Since the positions of the voltage generating motion sensors 6, 7, 8 relative to the position of the fine angle of rotation sensor depends on manufacturing and component tolerances, then to establish the absolute angular position WA of the rotary shaft, the value from the fine angle of rotation sensor 3, the count stored in the non-volatile memory 21, the condition vector "last revolution condition" Z and the count direction bit must be evaluated. This evaluation also takes into consideration the transitional condition which occurs with a change of rotational direction, according to equations (G12) and (G13), and synchronises information from the revolutions counter with the angle position given by the fine angle of rotation angle sensor. The result is a corrected counter condition N' which is a function of the angular position of the fine angle of rotation sensor, the condition vector "last revolution condition" Z and "count direction" RB. The evaluation is made according to the following algorithm:

| | |
|---|---|
| If RB = 1 AND Z = [100] AND WF < 180° then N' = N | (G19) |
| If RB = 1 AND Z = [100] AND WF > 180° then N' = N − 1 | (G20) |
| If RB = 0 AND Z = [100] AND WF < 180° then N' = N + 1 | (G21) |
| If RB = 0 AND Z = [100] AND WF > 180° then N' = N | (G22) |
| If RB = 1 AND Z = [010] AND WF < 300° then N' = N | (G23) |
| If RB = 1 AND Z = [010] AND WF > 300° then N' = N − 1 | (G24) |
| If RB = 0 AND Z = [010] AND WF < 300° then N' = N | (G25) |
| If RB = 0 AND Z = [010] AND WF > 300° then N' = N − 1 | (G26) |
| If RB = 1 AND Z = [001] AND WF < 60° then N' = N + 1 | (G27) |
| If RB = 1 AND Z = [001] AND WF > 60° then N' = N | (G28) |
| If RB = 0 AND Z = [001] AND WF < 60° then N' = N + 1 | (G29) |
| If RB = 0 AND Z = [001] AND WF > 60° then N' = N | (G30) | where:
RB: count direction
WF: angular position measured by the fine angle of rotation sensor
N: number of revolutions stored in the non-volatile memory 21
N': corrected number of revolutions The absolute angular position WA of the rotary shaft 2 after several revolutions is given by the combination of the angle measurement WF from the fine-wire angle of rotation sensor 3 and the corrected counter value N'. This is carried out by the computing and interface circuit 20:

$$WA = WF + N' \times 360°$$

with

WA: absolute angle of the shaft over several revolutions
WF: absolute angle of the shaft over a single revolution
N': corrected number of revolutions The absolute value is transmitted from the computing and interface circuit 20 via data-interface with conductors 14 to the supervisory unit 15. Since for most practical purposes the counter has to be set to a specific value then the transmission of a counter value from the supervisory unit 15 to the non-volatile memory of the angular rotation sensor is also provided.

Figure 11:
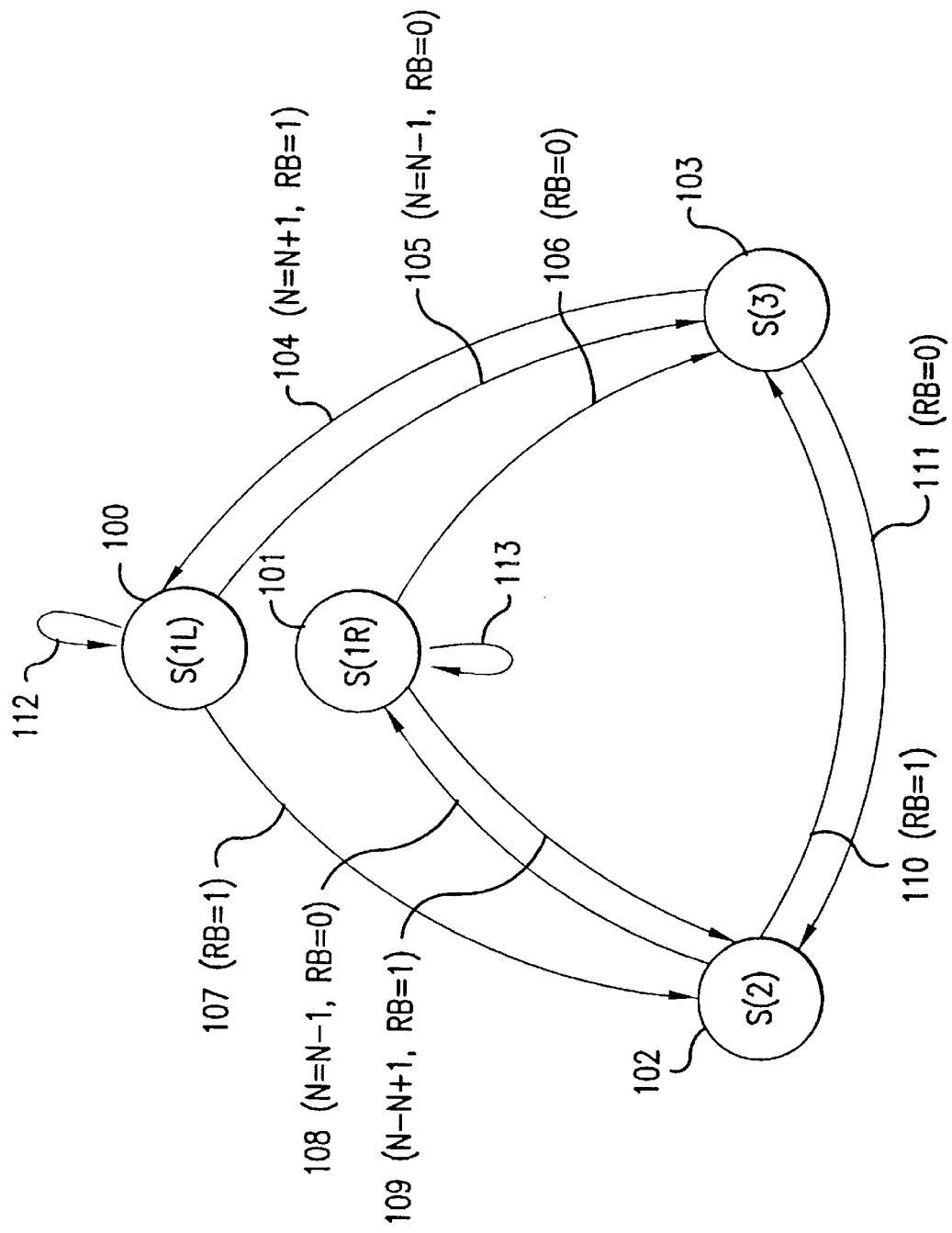

FIG. 11 shows an alternative graphical presentation of the logical conditions from equations G1 to G14 describing the counting of the shaft revolutions in the form of a state diagram. Accordingly, the motion of the shaft is represented by four logic states S(1L) 100, S(1R) 101, S(2) 102, S(3) 103 and ten state transitions corresponding to the shaft rotation in clockwise or anticlockwise direction.

The interpretation of the states

S(1L): actual switching magnet position in arc-segment I or III last count direction "up"

S(1R): actual switching magnet position in arc-segment I or III last count direction "down"

S(2): actual switching magnet position in arc-segment I or II

S(3): actual switching magnet position in arc-segment II or III

The following transitions between states are possible, the change of count N in the revolution counter and/or the change in direction bit RB are shown in the following table.

| | | | |
|---|---|---|---|
| S(1L) => S(2): | — | RB = 1, | Transition 107 |
| S(1R) => S(2): | N = N + 1 | RB = 1, | Transition 109 |
| S(1L) => S(3): | N = N − 1 | RB = 0, | Transition 105 |
| S(1R) => S(3): | — | RB = 0, | Transition 106 |
| S(3) => S(1L): | N = N + 1 | RB = 1, | Transition 104 |
| S(2) => S(1R): | N = N − 1 | RB = 0, | Transition 108 |
| S(2) => S(1L): | — | RB = 1, | Transition 110 |
| S(3) => S(1L): | — | RB = 0, | Transition 111 |
| S(1R) => S(1R): | — | — | Transition 112 |
| S(1L) => S(1L): | — | — | Transition 113 |

For monotonic anticlockwise rotation of the shaft, with transition states 104, 107, 110, incrementation of the up/down counter is given on transition 104. For monotonic clockwise rotation of the shaft, with transition states 106, 108, 111, decrementation of the up/down counter is given on transition 108. For reversal of rotation within the sectors I and II, transition states 112 and 113 occur without influencing either counter or count direction bit. For a change of rotation from anticlockwise to clockwise and passing out of sectors I and III, transition 105 occurs and the counter is decremented. For a change of rotation from clockwise to anticlockwise and passing out of sectors I and III, transition 109 occurs and the counter is incremented. The count direction bit is set to logic "1" on transitions 107, 109, 110, 104, and set to logic "0" on transitions 105, 106, 108, 111. The evaluation of the count direction bit occurs before each state transition, the update occurs after.

What is claimed is:

1. Angle of rotation sensor (1) for measurement of the angular position of a rotary shaft (2) over more than one revolution, including a fine angle of rotation sensor (3) attached to the rotary shaft which measures the absolute angular position of the rotary shaft over one revolution, and a counting arrangement (4) to count the total number of revolutions of the rotary shaft, wherein the counting arrangement (4) comprises at least two pulse-wire motion sensors (70, 71) fixed on an arc-segment, at least one permanent magnet (72), a nonvolatile read/write memory (21) and an electronic counter circuit (13); wherein a part of the electrical energy provided by the pulse-wire motion sensor (13) is used as a voltage supply;

wherein each pulse-wire motion sensor is connected to a pulse forming circuit (16), comprising a charging element (24) which is supplied with voltage pulses from the motion sensors via a switching element (23), and a further switching element (27) through which the voltage of the charging element is passed to an auxiliary voltage supply (34).

2. Angle of rotation sensor according to claim 1, wherein the switching elements (23, 27) are semiconductor diodes and wherein the charging element is a capacitor.

3. Angle of rotation sensor according to claim 1, wherein the pulse forming circuit comprises a discharging resistor (25) and an electronic switch (26) in series which is supplied with voltage from the charging element (24).

4. Angle of rotation sensor (1) for measurement of the angular position of a rotary shaft (2) over more than one revolution, including a fine angle of rotation sensor (3) attached to the rotary shaft which measures the absolute angular position of the rotary shaft over one revolution, and a counting arrangement (4) to count the total number of revolutions of the rotary shaft, wherein the counting arrangement (4) comprises at least two pulse-wire motion sensors (70, 71) fixed on an arc-segment, at least one permanent magnet (72), a nonvolatile read/write memory (21) and an electronic counter circuit (13); wherein a part of the electrical energy provided by the pulse-wire motion sensor (13) is used as a voltage supply;

wherein the storage element of the non-volatile read/write memory 21 is realized in ferroelectric technology as a crystal dipole, whose switching state is changed by application of an electric field.

5. Angle of rotation sensor according claim 1, wherein the non-volatile read/write memory 21 is a static semiconductor memory, supplied with voltage from a voltage energy store.

6. Angle of rotation sensor according to claim 1, wherein three unipolar pulse-wire motion sensors (6, 7, 8), a switching permanent magnet (10) attached to the rotary shaft (2) and two reset permanent magnets (11, 12) attached to the rotary shaft are used.

7. Angle of rotation sensor according to claim 1, wherein two bipolar pulse-wire motion sensors (70, 71), and at least one permanent magnet (72) attached to the rotary shaft (2) are used.

8. Angle of rotation sensor according to claim 1, wherein three unipolar pulse-wire motion sensors, six fixed permanent magnets and two ferromagnetic pole pieces attached to the rotary shaft (2) are used.

9. Angle of rotation sensor according to claim 1, wherein three bipolar pulse-wire motion sensors, six fixed permanent magnets and one ferromagnetic pole piece attached to the rotary shaft (2) are used.

10. Angle of rotation sensor according to claim 1, wherein one pulse-wire segment is attached to the rotary shaft (2), two fixed positioned sensing coils and four fixed positioned permanent magnets are used.

* * * * *